Aug. 20, 1935. W. O. EMMONS 2,011,853
RADIATOR CORE
Filed July 25, 1932
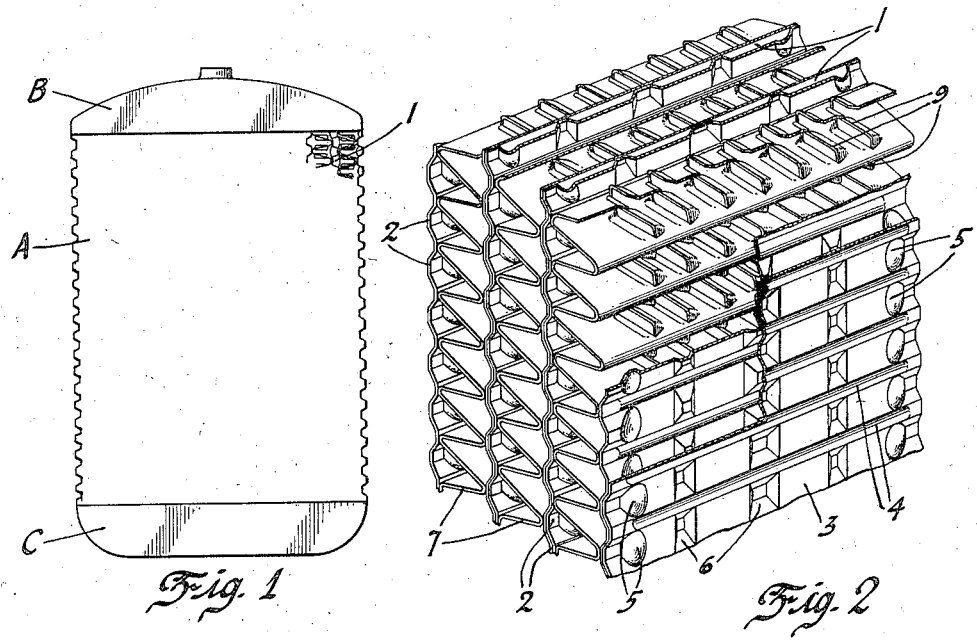
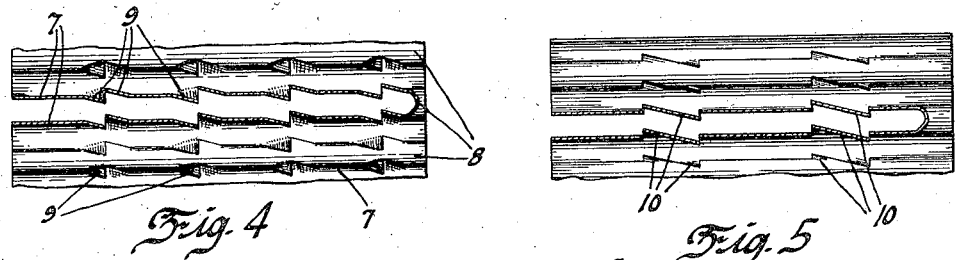
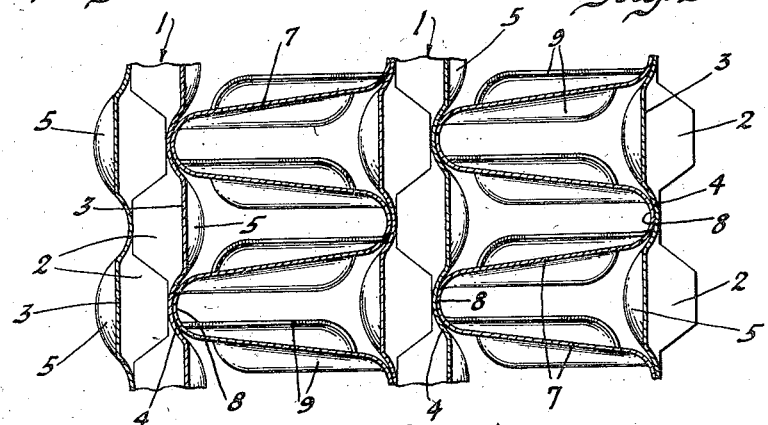
Inventor
Willard O. Emmons
By Blackmore, Spencer & Flint
Attorneys Patented Aug. 20, 1935

2,011,853

UNITED STATES PATENT OFFICE 2,011,853

RADIATOR CORE

Willard O. Emmons, Lockport, N. Y., assignor, by mesne assignments, to General Motors Corporation, Detroit, Mich., a corporation of Delaware Application July 25, 1932, Serial No. 624,402

1 Claim. (Cl. 257—130)

This invention relates to heat exchange devices, and particularly to core structures of the cellular type.

Cellular cores are well known in the art and are used extensively in connection with water cooled internal combustion engines. Although the core here involved is not restricted to any particular field, it is especially adapted for use as a part of the main cooling system of an engine and will be so referred to for the purpose of disclosing the novel features embodied therein.

As ordinarily constructed, an engine cooling radiator includes an inlet tank and an outlet tank for suitable connection with the water jacket of the engine, and a core or heat dissipating unit interposed between the two tanks for the travel of water in thin streams from one tank to the other through a number of spaced passageways or water tubes between which flows an air stream to take up or absorb heat carried by the water. According to preferred practice, the water tubes each consist of two plates or strips of thin metal, such as copper or brass, placed side by side with their intermediate portions spaced apart to provide the passageway and their edge portions nested and joined together and sealed by solder. In many cases these strips are corrugated or otherwise formed to afford a more or less tortuous path for agitating the liquid to get greater heat dissipation and a continuous washing or scrubbing of the walls. A separator or spacer strip is generally interposed between the water tubes for cooperation therewith and divides the intervening space into a number of small air cells.

The formation of air cells and the path of travel of the air stream are items with which this invention is particularly concerned, and it is an object of the invention to provide a group of air cells which open into one another at intervals, for the diversion of a portion of the incoming air stream from cell to cell, in succession, so as to make use of as many particles of air as is possible for the absorption of heat.

A further object of the invention is to provide an improved separator strip which affords an abundance of heat radiating surface and a maximum number of fins extending between the walls of adjacent tubes.

A further object is to provide a series of baffled openings in each fin, arranged for cooperation with the baffles in succeeding fins so that the incoming air stream is thoroughly broken up and particles thereof moved progressively through succeeding cells and into and out of wiping contact with the hot surfaces of the cell walls to take up heat transferred from the water.

A better understanding of the invention will be had from the following detailed specification, having reference to the accompanying drawing, in which Figure 1 is a front elevation of a core and tank assembly. Figure 2 is a perspective view of a section of the core. Figure 3 shows a fragment of the core in vertical section, the section being taken transversely of the water tubes, and Figures 4 and 5 are side elevations, with parts in section, of small portions of the separator strip, and they illustrate optional types of louvered openings in the fins.

In the drawing there is shown in Figure 1 a vertical flow automobile radiator, which includes a core or heat exchange unit A having at its upper end a top tank or inlet header B, and at its lower end a bottom tank or outlet header C. Hot water from the engine, after entering the top tank, flows downwardly and into the bottom tank for return to the engine, the flow being through a series of spaced passageways 1, provided by the core unit. In its passage through the core the water is cooled by an air stream passing through the core and between spaced water tubes.

Each water tube may be formed by a pair of wall units placed side by side in face to face relation, and as shown in the drawing, the mating walls are preferably duplicates of each other. In the present case, each wall is provided along both marginal portions or edges with a succession of equally spaced inwardly projecting offsets 2, of semi-hexagonal shape with the intermediate portion in line with each offset pressed slightly outwardly to afford a substantially flat wall 3, and the intermediate portion between succeeding offsets and wall portions 3, of rounded or curved formation to provide grooves or seats 4, which extend entirely across the wall and from edge to edge of the strip. In each wall section 3 and adjacent oppositely disposed offsets there may be provided outwardly pressed and rounded or parti-spherical projections 5 which cooperate with the grooves 4, and provide on both sides thereof, guiding and centering surfaces leading thereto. If the core has considerable depth it will be found advisable to provide one or more rows of indentations 6 in transverse alinement with the offsets 2 and of corresponding semi-hexagonal outline. It is to be understood that the two walls of each water tube are nested together with the offsets 2 and 6 of one wall in staggered relation to those of the other wall, so that they interfit with each other and maintain the intermediate portions spaced apart. The provision of the intermediate indentations or spacers 6 is necessary only where the walls are wide and support is needed to prevent inward collapse of the walls.

To hold the water tubes in properly spaced relation to each other and increase the radiating surface, use is made of a separator or fin plate of zigzag form, the corrugations preferably being relatively deep and providing a succession of oppositely inclined fins 7, extending from wall to wall with the reverse bends or apices between the relatively inclined fins of rounded formation for conveniently fitting the rounded seats 4.

It may be said here that the preferred method of assemblying the parts described, consists of bending a preformed wall strip of substantially twice the length of the size core desired, back to back, with a spacer strip therebetween, and the grooves 4 in one side offset to the grooves 4 on the other section, so that the rounded bends 8 properly seat therein. To assist seating engagement, the projections 5 afford inclined guiding surfaces on which the portions 8 may be slid into and find their proper seat in grooves 4. Several of the sub-assemblies are then nested together and held in a suitable clamping fixture while the opposite edges or front and rear faces are dipped first in a flux and then in molten solder to seal the margins of the walls of the water passages and join the fins to the walls. Because the contact of the parts 4 and 8 is continuous from edge to edge, there will be an inward capillary flow of solder toward the center of the core, and a positive bond will result throughout substantially the entire depth of the core to insure the free flow of heat into the fins.

It will be seen that the several fins divide the air space between adjacent tubes into a series of small cells, each of a shape somewhat resembling an isosceles triangle with the bases of succeeding cells oppositely disposed, the base of each cell being constituted by a wall section 3 so that most of the tube surface is directly exposed to the air stream and the bulk of the air in a given cell is closely adjacent the wall. To secure maximum efficiency and transference of heat, it is desirable to agitate and stir the thin column of air to cause different particles of air to sweep into and out of contact with the radiating surface as they pass through the core. To this end, it is proposed to provide each inclined fin with openings and scoop-like baffles or deflectors to break up the incoming stream and divert portions to other cells and at the same time direct the particles alternately from one side to the other.

In the embodiment of the invention as illustrated in Figures 2 and 4, each fin is provided with a suitable number of spaced slits and the material of the fin on both sides of each slit is pressed out of the plane of the fin but in opposite directions to form cooperating deflectors 9, with all the deflectors to one side of the plane of the fin facing the same direction and those on the other side all facing in the opposite direction. The two deflectors at each slit thus cooperate in affording an inclined passage between adjacent cells and the several passageways all incline in the same direction. For example, in considering the left hand end of the separator fragment, illustrated in Figure 4 as being in the front face of the core, the direction of inclination of all the communicating passages is from the upper left corner to the lower right hand corner of the drawing. However, no special care need be exercised in inserting a separator strip between the water passages, since the effect on the air stream will be the same regardless of which edge is in the front face of the core. Air entering the cells from the left in Figure 4 will be broken up upon reaching the first row of deflecting passages and that portion that has passed over the lower wall of a given cell will be diverted into the next lower cell and join or merge with the portion of the air stream which has previously passed along the upper wall of that cell. Thus the air particles that were in wiping contact with opposite sides of a given fin move toward the center of the air column beyond the deflecting passage and below the fin, with the outer strata of the air column occupied by air particles which prior to the shift were out of fin contact. The deflecting passages or inclined chutes being in longitudinal alinement in the several fins the transfer occurs in all cells at the same point and eliminates interference to free flow. The rearrangement of air particles is repeated at intervals as the air particles travel through the core. That is, the individual particles are alternately in the central and outer strata, the changes occurring as each deflector passage is reached. By properly gaging the heighth of the deflector portions in the cell, the inward and outward movement of the particles may be governed so that a progressive change in strata, rather than abrupt change is effected. In this way, the air particles are thrown into and out of wiping contact with the radiating surfaces, and since the streams are relatively narrow, practically every particle will for a part of its travel strike the walls and absorb heat therefrom. For this reason a maximum heat transfer is obtained without any appreciable restriction to free flow. Some of the air particles entering one cell will transfer at each passageway and travel successively in from three to seven cells, depending on the number of transfer points provided, before leaving the core.

In addition to the movement just referred to, the air particles will be moved laterally to one side or another as the transfer is effected. The cause of this will be best appreciated from an inspection of Figure 3, where it will be noticed that the leading edge and main body of each deflector lies in a horizontal plane and at an angle to the inclined fin. This means that the widest part of the mouth of the passageway is positioned in the widest part of the triangular shaped cell and that the widest part of the outlet is in the widest part of the next adjacent cell. Since the wide and narrow parts of succeeding cells are alternately arranged, it follows that the air scooped from the wide part of one cell is directed laterally through the passage and into the wide part of the adjacent cell. From the last mentioned cell, the transfer to the succeeding cell effects a lateral movement, but in the opposite direction. Thus the air particles will alternately shift to the right and let in their successive transfers from cell to cell.

The character of the action described is much the same when the deflector arrangement illustrated in Figure 5 is employed and no detailed discussion thereof is deemed necessary. In this case the slits in the respective fins are grouped in pairs and the material between the slits of each pair is twisted to form the deflector or vane 10, one end of which extends above and the other end below the plane of the fin. Any number of deflector passages may be used, depending upon the size of the core and its conditions of use.

I claim:

A heat exchanger for conducting fluid between a pair of spaced tanks, including a group of spaced passages extending from one tank to the other and each comprising a pair of mating wall strips, fin seats arranged in staggered relation on adjacent strips of successive passages, zigzag fin strips spacing said passages and each providing a series of fins extending in inclined relation on straight lines from one strip to the other and seating along opposite sides in the staggered seats of the strips, each in converging relation to the next succeeding fins, to provide a stack of alternately disposed triangular air cells, a series of air chutes in the fins arranged in sets spaced from each other between the front and rear of the core and in longitudinal alignment in each set, and inclined in the same direction from front to rear of the core and extending substantially normal to the wall strips at the entrance mouths thereof to provide an entrance opening for each chute that tapers in area and is largest in the widest part of the triangular air cell, whereby a progressive movement of air particles through succeeding cells occurs at regular intervals at the same relative positions in all the cells simultaneously and in the same direction from front to rear but to opposite sides at succeeding chutes.

WILLARD O. EMMONS.